Figure 1:
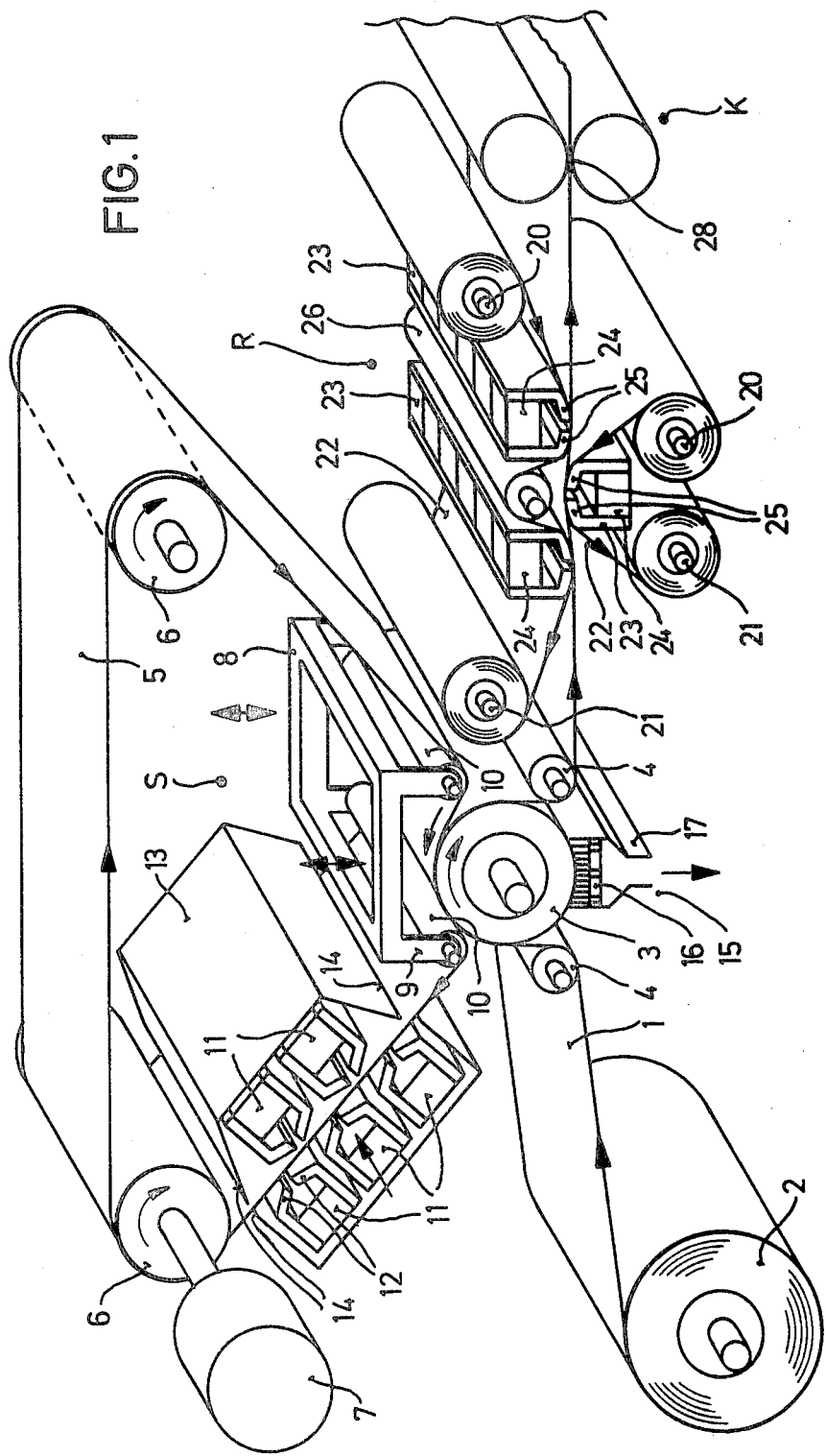

United States Patent [19]  [11] 4,254,585
Schoettle et al.  [45] Mar. 10, 1981

[54] PROCESS AND APPARATUS FOR THE SURFACE TREATMENT OF FLEXIBLE MAGNETIC RECORDING MEDIA

[75] Inventors: Klaus Schoettle, Heidelberg; Wulf Muenzner, Frankenthal; Hilmar Lechner, Ludwigshafen; Dieter Woeppel, Waldsee; Lothar Gliniorz, Frankenthal, all of Fed. Rep. of Germany

[73] Assignee: BASF Aktiengesellschaft, Ludwigshafen, Fed. Rep. of Germany

[21] Appl. No.: 3,947

[22] Filed: Jan. 16, 1979

[51] Int. Cl.³ ............................................. B24B 21/04
[52] U.S. Cl. .................................. 51/5 A; 51/262 A; 51/324; 427/130
[58] Field of Search ................... 51/5 A, 5 R, 135 R, 51/324, 328, 262 A; 15/256.5, 100; 427/130; 360/134

[56] References Cited
U.S. PATENT DOCUMENTS

| 2,680,938 | 6/1954 | Peterson | 51/5 A |
| 3,266,196 | 8/1966 | Barcaro | 360/134 X |
| 3,370,982 | 2/1968 | Hayunga | 52/135 R |
| 3,475,782 | 11/1969 | Teuber | 15/100 X |
| 3,510,903 | 5/1970 | Stoever | 15/256.5 |
| 3,596,413 | 8/1971 | Stewart | 51/262 A |
| 3,616,478 | 11/1971 | Murtz | 15/93 R |
| 3,641,605 | 2/1972 | Lindsay | 15/100 X |
| 4,010,514 | 3/1977 | Fischer | 15/100 X |
| 4,100,326 | 7/1978 | Somezawa | 427/130 |
| 4,108,546 | 8/1978 | Rezanka | 209/223 R |

Primary Examiner—Gary L. Smith
Attorney, Agent, or Firm—Keil & Witherspoon

[57] ABSTRACT

A process and apparatus for the treatment of the recording surface of magnetic recording media using consecutively arranged units for burnishing, cleaning and calendering the web of plastics film provided with a magnetic coating. The process and apparatus of the invention are particularly suitable for the manufacture of magnetic tapes for the recording and playback of video signals.

6 Claims, 3 Drawing Figures

PROCESS AND APPARATUS FOR THE SURFACE TREATMENT OF FLEXIBLE MAGNETIC RECORDING MEDIA

The present invention relates to a process and an apparatus for the surface treatment of magnetic recording media, in which the web of base material provided with the recording layer is passed through a calender having at least one nip.

Magnetic tapes, especially those for the recording and playback of video signals, are required to have a magnetic coating exhibiting an extremely smooth and plane surface. Surface roughness and surface undulations causes variations in the head-to-medium spacing in the case of recording and/or playback heads which are in contact with the magnetic coating, and these manifest themselves as amplitude variations, i.e. fluctuations in the level of the recorded or reproduced signals. Such variations are particularly objectionable in the recording or playback of video signals, since very small magnetic head gaps of 0.3 $\mu$m or less and very short signal wavelengths of 0.8 $\mu$m or less are employed. If the variation in spacing is sinusoidal, it causes amplitude modulation of the signal recorded at a specific frequency. If the spacing varies irregularly, in accordance with the random distribution of the tape surface irregularities, the recorded signal is additionally amplitude-modulated by a noise voltage.

The causes of such objectionable irregularities in the coating surface are known to be irregularities or flaws in the web of base material which are for example caused by the inorganic fillers which are frequently incorporated into the base material by the plastics film manufacturer to improve the winding characteristics of the butt rolls. Examination of the coating surface under the microscope reveals that it exhibits, at intervals of a few microns, isolated protrusions formed by relatively sharp-edged filler particles which project up to 0.3 $\mu$m above the surface of the film. These protrusions are covered over and levelled out to only a very limited degree in the case of thin magnetic coatings of less than 5 $\mu$m, such as are conventionally employed in video tapes, and therefore frequently extend as far as the surface of the magnetic coating. If the magnetic coating is less than 2 $\mu$m thick, irregularities or flaws in the film are almost always also visible on the surface of the magnetic coating.

Further causes of coating unevenness are faults occurring during the coating operation, for example streaks or undulations resulting from disturbances in the coating equipment or from oscillations in the film transport system; protruding agglomerated magnetic particles; or dust particles embedded in the coating.

In addition, during the conventional calendering of magnetic tapes, in which the magnetic coating, after application to the web of base material, is compressed and smoothed, foreign particles or dust may be pressed into the coating or local pressure peaks may occur as a result of irregularities or hard inclusions in the paper rollers, which pressure peaks may in turn cause local embossing of the magnetic coating.

Furthermore, it has been found that when calendering the coated web, suffering from the above flaws in the magnetic coating or in the plastics film, only a certain proportion of the surface irregularities, especially the smaller protrusions, can be levelled out to such an extent that they no longer adversely affect the performance of the recording medium, by plastic compression of the magnetic coating employing the usual pressure (maximum nip pressure 300 kp/cm). The larger and harder protrusions partially undergo elastic deformation during calendering and return after the coated web has passed the calender nip. It is also possible for the hard inclusions or protrusions on the tape to press into the resilient paper roller and cause indentations—which may persist for at least several revolutions or may be permanent—which indentations in turn result in poorer calendering of the subsequent length of the web because no pressure or less pressure is applied at the indented points.

Another way of improving the surface properties of recording media in tape form has been, as proposed in U.S. Pat. No. 3,943,666, to pass the coated flexible substrate over a resilient backing cylinder and to burnish the surface of the magnetic coating with an abrasive cylinder.

When using this abrasive member in practice, it has been found that whilst the agglomerates which protrude from the surface of the recording layer are removed, the surface roughness itself increases and the surface frequently exhibits scratches since continuous cleaning of the abrasive cylinder to remove abrasive dust is difficult. Effective cleaning is only possible if the burnishing process is interrupted.

It is an object of the present invention to provide a process and an apparatus by means of which the surface of flexible recording media can be substantially freed from irregularities.

We have found that this object is achieved by a process wherein the surface of the magnetic coating is burnished and freed from abrasive dust before the coated web enters the nip.

The apparatus for carrying out the process of the invention comprises:

(a) a burnishing unit, consisting of a rotatably mounted backing roller for the coated web, an abrasive element located above this roller, and guide rollers and devices for causing the coated web and the abrasive element to move continuously in opposite directions, (b) a cleaning unit, downstream of the burnishing unit, consisting of at least one reelable web of nonwoven fabric and one or more guide members for causing surface contact between the coated web and the web of nonwoven fabric, and (c) a calender unit, downstream of the cleaning unit, possessing one or more nips for the coated web which has been burnished and freed from abrasive dust.

In an advantageous embodiment of the apparatus of the invention, the abrasive element is an endless abrasive belt which can be urged against the recording layer surface, supported on the backing roller, by means of two biassing rollers which are arranged parallel to, and symmetrically with respect to, the backing roller and are rotatably mounted in a frame. Furthermore, one or more air gaps formed between magnetic poles extend directly over each surface of the abrasive belt, over the entire width of the latter.

In a further advantageous embodiment, the support surface of the backing roller is in contact, over its entire width, with brush means, and the back of the brush means is connected to a source of vacuum.

In another embodiment of the apparatus according to the invention, the abrasive element is in the form of a rotary member provided with bristles or lamellae, the rotary member being surrounded by a housing which is provided with at least one inlet and at least onw outlet for setting up a directional flow of air.

It is advantageous to arrange the inlet for the stream of air immediately after the point of contact of the rotary member with the coated web so that the stream of air moves tangentially past the backing roller.

What is special about the process of the invention is that the surface of the magnetic coating, after application to the web of base material, is freed from surface irregularities by uniform burnishing of the coating and is then cleaned before the coated web is calendered.

This process has the advantage that the uncalendered magnetic coating with its rough surface is easier to burnish than a coating which has been calendered. A coating which has been smoothed by burnishing requires less calendering pressure in the subsequent calendering step than a rough coating, since, to obtain the same final surface roughness, the resilient calendering rollers need, on average, be pressed in less deeply, due to the absence of peaks. The pressure distribution in the nip is as a result more uniform. Moreover, greater evenness of the surface of the coating is achieved, the risk of local embossing being eliminated or at least greatly reduced. Accordingly, the first two steps of the process according to the invention greatly improve the calendering action of conventional calenders.

A further advantage of the process according to the invention is that any scratches which may be produced, for example, during burnishing of the coating can in most cases be entirely eliminated by the subsequent treatment in the calender, or can be reduced to such an extent that they are of the order of magnitude of the surface roughness and hence no longer interfere with the recording and/or playback of, for example, video signals.

The burnishing unit, in conjunction with the downstream cleaning unit, ensures trouble-free calendering. It is particularly advantageous that, in the case of the embodiment using an abrasive belt as the abrasive member, the belt can be effectively cleaned during continuous operation. At the same time, a low surface roughness of the recording layer can be achieved by the use of very fine abrasive coatings, so that in the end the surface properties of the recording layer, after calendering, are much better than those that are achievable with conventional equipment.

Figure 2:
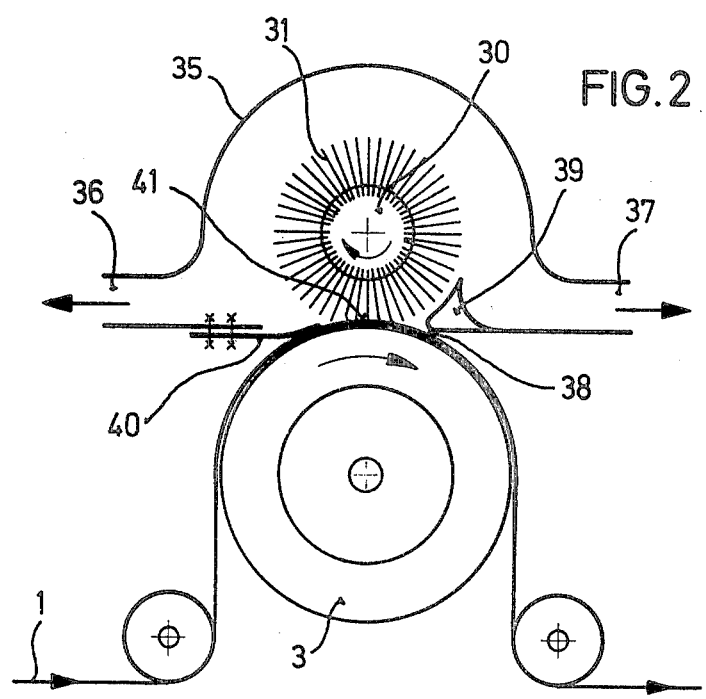
Figure 3:
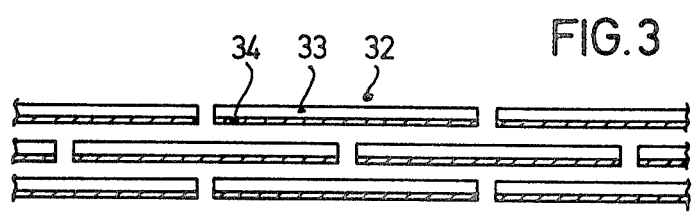

Further details of the process and apparatus according to the invention are disclosed in the following description of the embodiments shown in the accompanying drawings, in which FIG. 1 is a schematic overall view of an embodiment of the apparatus of the invention with an abrasive belt as the abrasive element;

FIG. 2 is a schematic partial side view of an embodiment with a rotary brush as the abrasive element; and FIG. 3 shows a portion of the surface of an abrasive element in the form of rotary member provided with lamellae.

FIG. 1 shows the sequence of procedural steps. The apparatus consists of consecutively arranged units S, R and K for burnishing, cleaning and calendering the web of base material provided with a magnetic coating. The coated web 1 is fed from a supply roll 2, or directly from the equipment which applies the magnetic coating, to a rotatably mounted backing roller 3 of the burnishing unit S, and is urged by means of the guide rollers 4 against the backing roller, the angle of wrap of the web being from 90° to 270° (FIG. 1). The recording layer is on the side of the web which faces away from the backing roller 3.

An endless abrasive belt 5 of a conventional type runs over two guide rollers 6, of which one is connected to an electric motor drive 7, and passes over the backing roller 3, with the abrasive coating (particle size preferably from 3 to 20 $\mu$m) facing the web 1. A frame 8 which is movable relative to the backing roller 3 carries, on projections 9, two biassing rollers 10 arranged symmetrically with respect to, and parallel to, the backing roller 3; these biassing rollers serve to urge the abrasive belt 5 against the recording layer on the web in order to burnish it, the angle of wrap being adjustable by altering the distance between the frame 8 and the backing roller 3. Preferably, the coated web and the abrasive belt run in opposite directions, the relative speed being preferably greater than 3 m/sec.

After contact with the coated web at the backing roller, the abrasive belt runs through a cascade of magnets 11, located on both sides of the belt, the poles 12 of which magnets form air gaps extending over the entire width of the abrasive belt, there being no contact between the abrasive belt surfaces and the poles 12. Preferably, permanent magnets are used, though electromagnets can of course also be employed. The poles consist of soft magnetic steel. The fields produced by the magnets 11 attract the magnetizable abrasive dust adhering to the abrasive belt, so that the belt is freed from the abrasive dust which mainly collects in the air gap at the poles 12. Since the major portion of the abrasive dust adheres to the abrasive coating, more magnets 11 are provided on the abrasive coating side of the belt 5 than on the back of the belt. At certain intervals, the abrasive dust which collects at the poles is removed, for example by means of a powerful jet of compressed air. The magnets 11 are surrounded by a housing 13 so that the abrasive dust, when blown off the poles, cannot escape into the atmosphere but can instead be drawn into the inlet to a suction line (not shown in the drawing) in the region of the end faces of the magnets, behind the housing. For the same reason, sealing strips 14 are attached to the opposite walls of the housing which constitute the sides at which the abrasive belt respectively enters and leaves the magnet assembly.

Instead of the magnets, it is of course also possible to employ mechanical cleaning devices, such as brushes, or nozzles for flushing away the abrasive particles with a gas, e.g. air, or with a liquid.

The backing roller 3 is provided with a smoothly ground covering, for example of polyurethane rubber, which reduces any excessive tension applied to the coated web, and prevents scratches from being formed by particles of dust or abrasive. If, as in the present embodiment, the abrasive belt 5 is resiliently urged against the backing roller 3, the latter can be provided with a very finely machined hard steel or chromium surface. In this case, the guide rollers 4 are provided with a resilient covering and bear with a certain pressure against the backing roller 3. The latter is driven by an electric motor (not shown in the drawing) which is controlled by the film tension. This prevents the coated web from being subjected to unacceptably high tension in the region of the backing roller 3.

In order to remove dust and foreign particles, which may for example have originated from the back of the coated web 1, from the backing roller 3, a brush 15 with a perforated back 16 and a housing 17 enclosing the bristles and the back is mounted underneath the backing roller. The dust collecting in the bristles is drawn off via the perforations in the back 16 by means of a vacuum source (not shown in the drawing) connected to the housing 17. In the case of a backing roller having hard surface, the brush 15 can be replaced by a wiper blade.

After passing through the burnishing unit S, the web 1, carrying the magnetic coating which has been burnished, passes through a cleaning unit R which comprises webs of nonwoven fabric 22 travelling, on both sides of the film web, from supply rolls 20 to take-up rolls 21. Guide members 23 ensure close contact between the webs of nonwoven fabric and the surfaces of the coated web. It is advantageous to construct the guide members from magnets 24 with poles 25, such as are described above for the cleaning of the abrasive belt. This intensifies the cleaning action, since the magnetizable abrasive dust is drawn into the webs of nonwoven by the lines of magnetic force. A cleaning unit of this type is described in U.S. patent application Ser. No. . . . . 973,799 filed by K. Schoettle, P. Dobler, H. Lewin and E. Koester on Dec. 28, 1978, now allowed, and assigned to BASF Aktiengesellschaft. To obtain a more favorable path of travel of the upper web of nonwoven fabric and to increase the pressure applied, a guide roller 26 is provided on the coated side of the web between the two guide members 23. For the side of the web which has not been burnished, a single area of of contact with the web of nonwoven fabric suffices, whilst on the coated side of the web at least two contact areas should be provided. To improve the cleaning action, the cleaning unit can oscillate transversely to the coated web.

The combination of the webs of nonwoven fabric and the manetic guide members is particularly advantageous, but of course other, conventional cleaning means which are equally effective may be used.

The cleaning unit R is followed, in the direction of travel of the coated web 1, by a calender K of conventional design, by means of which the burnished magnetic coating is smoothed and compressed. It is advantageous to employ calenders with 2 or more nips 28; the nip pressure should be from 50 to 350 kp/cm, preferably from 150 to 250 kp/cm. In trial runs it has been found that, after calendering, the burnished and cleaned magnetic coating has a surface roughness of less than 0.1 $\mu$m.

The burnishing unit shown in FIG. 2 constitutes a further advantageous feature of the invention. Burnishing of the magnetic coating of the film web 1 is effected by a rotary member 30 (the contact area being marked 41). This rotary member can be a commercial rotary brush having bristles 31 consisting of metal or of plastics filaments, in which minute particles of abrasive such as corundum may be embedded. A lamellar structure, as shown in FIG. 3, comprising abrasive lamellae 32 arranged radially to the axis of the rotary member and staggered relative to one another, is also conceivable.

The abrasive lamellae 32 consist for example of a support 33 made of a woven or nonwoven fabric or a plastics film, and an abrasive coating 34 consisting of corundum or other abrasive particles embedded in a binder. The rotary member 30 is driven by an electric motor (not shown). To prevent abrasive dust from escaping into the atmosphere, the rotary member is surrounded by a housing 35 connected, at two outlets 36 and 37, to a suction fan (not shown in the drawing). The air drawn in enters mainly through the gap 38 between the baffle 39 and the backing roller 3. To achieve a better seal at the point of entry of the coated web into the burnishing unit, a thin sealing strip 40 is attached to the housing 35, opposite the baffle 39; this strip bears lightly against the surface of the magnetic coating and thereby prevents abrasive dust from being flung out as a result of the centrifugal forces produced by rotation of the rotary member 30. The rotary member 30 and the sealing strip can oscillate in an axial direction.

The relative speed of the roller 30 and the coated web 1 is selected in accordance with the desired amount of abrasion and in accordance with the particular magnetic coating, but is preferably greater than 3 m/sec. The particle size of the abrasive in the abrasive lamellae 32 is preferably from 3 to 20 $\mu$m.

As in the case of the apparatus shown in FIG. 1, the burnishing unit described above is followed by the cleaning unit (R) and the calender (K).

We claim:

1. In the manufacture of magnetic media in the form of a web of base material coated with the recording layer, a process for the surface treatment of the coated web, comprising in this order, the steps of:
   burnishing the magnetic coating;
   freeing the magnetic coating from abrasive dust; and
   passing the coated web through a calender having at least one nip.

2. An apparatus for carrying out the process as claimed in claim 1, comprising
   (a) a burnishing unit, including a rotatably mounted backing roller for the coated web, an abrasive element located above this roller, and guide rollers and devices for causing the coated web and the abrasive element to move continuously in opposite directions,
   (b) a cleaning unit, downstream of the burnishing unit, including at least one reelable web of nonwoven fabric and at least one guide member for causing surface contact between the coated web and the web of nonwoven fabric, and
   (c) a calender unit, downstream of the cleaning unit, possessing at least one nip for the coated web which has been burnished and freed from abrasive dust.

3. An apparatus as claimed in claim 2, wherein the abrasive element is an endless abrasive belt and wherein there are provided two rotatably mounted backing rollers which urge the abrasive belt against the recording layer surface, supported on the backing roller, said rollers being arranged parallel to, and symmetrically with respect to, the backing roller, and magnetic poles forming therebetween at least one air gap which extends directly over each surface of the abrasive belt, over the entire width of the latter.

4. An apparatus as claimed in claim 2, wherein the support surface of the backing roller is in contact, over its entire width, with brush means, and the back of the brush means is connected to a source of vacuum.

5. An apparatus as claimed in claim 2, wherein the abrasive element is in the form of a rotary member provided with bristles or lamellae, the rotary member being surrounded by a housing which is provided with at least one inlet and at least one outlet for setting up a directional stream of air.

6. An apparatus as claimed in claim 5, wherein the inlet for the stream of air is arranged immediately after the point of contact of the rotary member with the coated web so that the stream of air moves tangentially past the backing roller.

* * * * *

UNITED STATES PATENT AND TRADEMARK OFFICE
CERTIFICATE OF CORRECTION

PATENT NO. : 4,254,585
DATED : March 10, 1981
INVENTOR(S) : Klaus Schoettle et al It is certified that error appears in the above-identified patent and that said Letters Patent are hereby corrected as shown below:

On The title page add the following:

-- [30] Foreign Application Priority Data

January 30, 1978 Fed. Rep. of Germany......2803914 --.

Signed and Sealed this

Second Day of June 1981

[SEAL]

Attest:

RENE D. TEGTMEYER

Attesting Officer — Acting Commissioner of Patents and Trademarks